(12) United States Patent
Kaiser et al.

(10) Patent No.: US 7,134,517 B1
(45) Date of Patent: Nov. 14, 2006

(54) DUAL ELECTRIC MOTOR FOUR WHEEL DRIVE PERSONNEL CARRIER

(76) Inventors: Clements J. Kaiser, 159 Beau Pre Rd., Natchez, MS (US) 39120; Joseph R. Palermo, Jr., 1502 Palermo Dr., Sulphur, LA (US) 70663

( * ) Notice: Subject to any disclaimer, the term of this patent is extended or adjusted under 35 U.S.C. 154(b) by 0 days.

(21) Appl. No.: 10/776,874

(22) Filed: Feb. 10, 2004

Related U.S. Application Data

(60) Provisional application No. 60/446,218, filed on Feb. 10, 2003.

(51) Int. Cl.
*B60K 1/02* (2006.01)
(52) U.S. Cl. ............... 180/65.6; 180/233; 180/65.8
(58) Field of Classification Search ............... 180/248, 180/243, 242, 233, 65.1, 65.6, 65.8
See application file for complete search history.

(56) References Cited

U.S. PATENT DOCUMENTS

| | | | |
|---|---|---|---|
| 5,680,908 A | * | 10/1997 | Reed .................. 180/65.3 |
| 6,332,504 B1 | * | 12/2001 | Adds .................. 180/65.2 |
| 6,401,849 B1 | * | 6/2002 | Seguchi et al. ........... 180/65.6 |
| 6,491,126 B1 | * | 12/2002 | Robison et al. ........... 180/233 |
| 6,524,217 B1 | * | 2/2003 | Murakami et al. .......... 477/5 |
| 6,615,946 B1 | * | 9/2003 | Pasquini et al. .......... 180/248 |
| 6,617,703 B1 | * | 9/2003 | Matsubara et al. ....... 290/40 C |
| 2003/0042053 A1 | * | 3/2003 | Yoshikawa et al. ....... 180/65.1 |

* cited by examiner

*Primary Examiner*—Tony Winner

(57) ABSTRACT

Described is a battery powered, four-wheel, all-terrain vehicle, with independently operable, variable speed, bi-directional electric motors, one of which may selectively used to drive the front wheels of the vehicle, the other of which may be selectively used to drive the rear wheels of the vehicle. A front differential drive mechanism allows the front wheels to operate at different speeds. Front wheels of the vehicle are steerable through universal joints disposed between the front differential mechanism and each front wheel. A rear differential drive mechanism allow the rear wheels to rotate at different speeds. By selectively choosing whether to engage front and rear wheels and the direction they rotate, the vehicle may be operated as a four-wheel drive vehicle, a front-wheel drive vehicle, a rear wheel drive vehicle, with all four wheels disengaged, or even with front and rear wheels rotating in opposite directions.

10 Claims, 3 Drawing Sheets

DUAL ELECTRIC MOTOR FOUR WHEEL DRIVE PERSONNEL CARRIER

CROSS REFERENCE TO RELATED APPLICATIONS

This application claims priority to Provisional Patent Application No. 60/446,218 filed Feb. 10, 2003.

BACKGROUND

1. Field of the Invention

The invention relates to battery powered, electrically motored, four wheel personnel carriers designed for off-road use in rough terrain. With more particularity, the invention relates to a vehicle in which may be selectively operated in "four wheel drive" (all four wheels are driven), "front wheel drive" (the front two wheels are driven) or "rear wheel drive" (the rear two wheels are driven). The vehicle of the invention is equipped with two independently operable electric motors, one of which powers the front wheels and one of which powers the front wheels. Constant velocity ("CV") joint is used on the front wheels to make them steerable.

2. Description of Related Art

There are millions of motorized vehicles, of various shapes, forms, purposes and designs. Some of said designs relate to four wheel drive all terrain vehicles. Most are driven by single internal combustion engine. Some may be selectively operated with all four wheels driven, or only the two rear wheels driven. None are known which may be selectively operated with all four wheels driven, with only the rear wheels driven, or with only the front wheels driven.

As to off the road vehicles, driven by single electric motor, powered by a battery, such as rear wheel driven golf carts, are known. None of these type of vehicles are known to have four-wheel drive capability. None of these types of vehicles are known to employ dual, independently operable, selectively disengagable, electric motors, one for driving the front wheels, the other for driving the rear wheels, thereby the vehicle may be operated as a four-wheel drive vehicle, a front-wheel drive vehicle, a rear wheel drive vehicle, with all four wheels disengaged, or even with front and rear wheels rotating in opposite directions.

The invention disclosed and claimed herein is equipped with dual, independently operable electric motors. One is for driving the front wheels of the vehicle, the other for driving the rear wheels. Therefore the vehicle disclosed and claimed herein may be selectively operated as a four-wheel drive vehicle, a front wheel drive vehicle, or a rear wheel drive vehicle. The vehicle could even be operated with the front wheels driving in one direction, the rear wheels driving in the opposite direction, which does have some utility, such as making the vehicle track sidewards when on an transversely inclined slope. When operated in the two-wheel drive mode (either front-wheel drive or rear wheel drive) the non-driven motor may be mechanically disconnected from the wheels, thereby eliminate drag of the non-driven motor as an energy saving mean.

DESCRIPTION OF THE PREFERRED EMBODIMENT OF THE INVENTION

Figure 1:
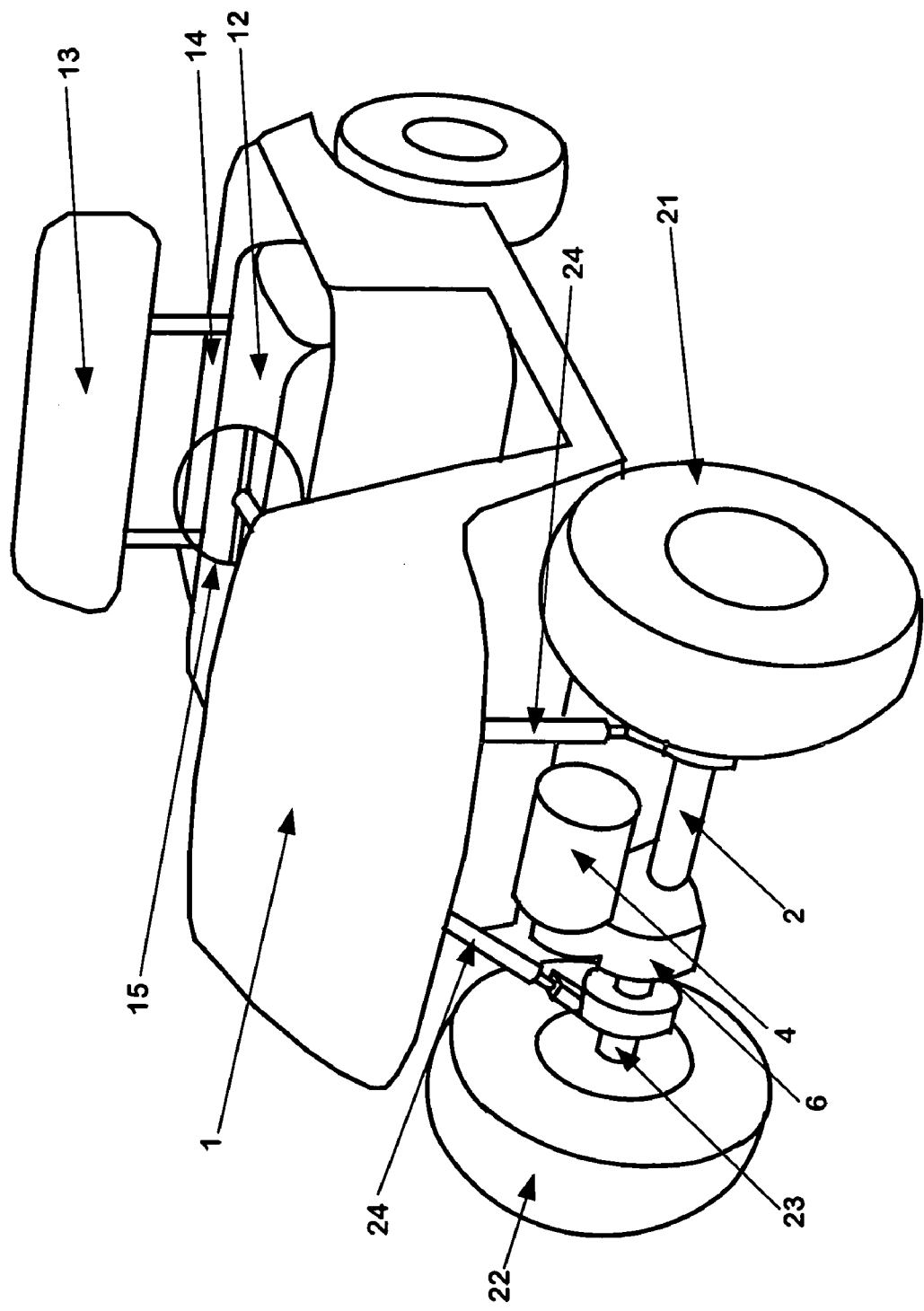
FIG. 1 is a perspective view of the invention from the front and left thereof.

The invention herein disclosed is a vehicle. Said vehicle comprises a body, two front and two rear wheels, front and rear axles, front and rear differentials, left and right front constant velocity ("CV") joints, an electric battery, front and rear electric motors, means for controlling the flow of electricity to said motors, a suspension system, a steering system and a braking system. In preference the body 1 of the vehicle will be small and light so as to minimize electric power utilization and thereby extend life of the battery charge. Lightweight metal, such as aluminum, or lightweight fiberglass reinforced resins are the preferred material for construction of the body, but other lightweight materials are comprehended by the invention. Said body 1 may be attached to a vehicular frame, but in the preferred embodiment will not be, but rather be of "uni-body" design (that is where ridges and curves of the body are designed to produce required strength and rigidity of the body). Those skilled in the art of design of vehicle bodies will be familiar with bodies of this design.

In the preferred embodiment of the invention the vehicle is wide enough to carry two personnel seated side-by-side. In said embodiment a bench type seat 11 is provided for personnel seating. In preference the seat will be provided with some padding. In preference the seat will have a padded back rest 13 associated therewith. The body 1 may also include a cargo area 14, preferably behind the back rest of the seat. Although the vehicle is not intended for use on public roads various features such as seat belts, roll bars or structures designed to protect the occupants of the vehicle from injury in the event of roll-over, padding to minimize injury to the occupants in the event of collision, doors and various other safety or cosmetic features may be incorporated into design of body 1 if desired.

In addition to seating of the occupants of the vehicle, the body of the vehicle will include conveniently located controls for regulating acceleration and speed, steering and braking of the vehicle. In the preferred embodiment the layout of these control mechanisms will be generally similar to the layout of controls in a standard automobile, that is a steering wheel located in front of the operator and braking and power controls being foot-pedals located near the operator's feet.

The braking means may vary as desired. Comprehended by the invention are electric, hydraulic or mechanical braking systems, which operate by application of a brake shoe or pad on a drum or disc attached to the wheels of the vehicle. Those skilled in the art of vehicle design will be familiar which such various braking systems and permutations thereof.

While in the preferred embodiment of the invention a steering wheel 15 is utilized as the means for human input to the steering mechanism, the invention comprehends the use of other means of human input to a steering mechanism, such as stick or lever means, which those skilled in the art of vehicle design will be familiar with. While in the preferred embodiment of the invention the steering and braking means are not integrated with power control means, it is comprehended by the invention that they may be (for example use of a stick, the movement of which to the right or left could regulate steering of the vehicle to the right or left, the forward movement of which could regulate application of power to one or both motors and rearward movement of which could regulate braking).

Whatever means is used to control steering of the vehicle to the left and right, in the preferred embodiment of the invention the result of steering input is to turn the front wheels of the vehicle, comprising a left 21 and a right front wheel 22, in a synchronized movement to the left and right. While this could be accomplished (and thus is comprehended by the invention) by rotating the front axle of the vehicle 2 about a vertical axis, in the preferred embodiment of the vehicle it is not accomplished in that manner, but by turning only the front wheels of the vehicle 21 and 22, not the axle itself. In order to accomplish that the front axle 2 of the vehicle, which is a powered axle in the preferred embodiment of the invention, must be equipped with a joint 23 which allows for transmission of torque from the axle to the wheel, but nevertheless allows the wheels 21 and 22 to pivot about a vertical axis separate from axle 2. Furthermore the joint must allow for camber and caster angles of the wheel to changes as the suspension of the vehicle 24 adjusts for road surface variations. In the preferred embodiment of the invention a constant velocity ("CV") joint 23 is provided for these purposes. Varying designs of CV joints are known to those skilled in the art of mechanical power transmission. Other types of joints which transmit torque but allow both angle and distance between input and output shafts, including slidably disposed "universal joints", may be used for such purpose, and are familiar to those skilled in mechanical power transmission systems.

Figure 2:
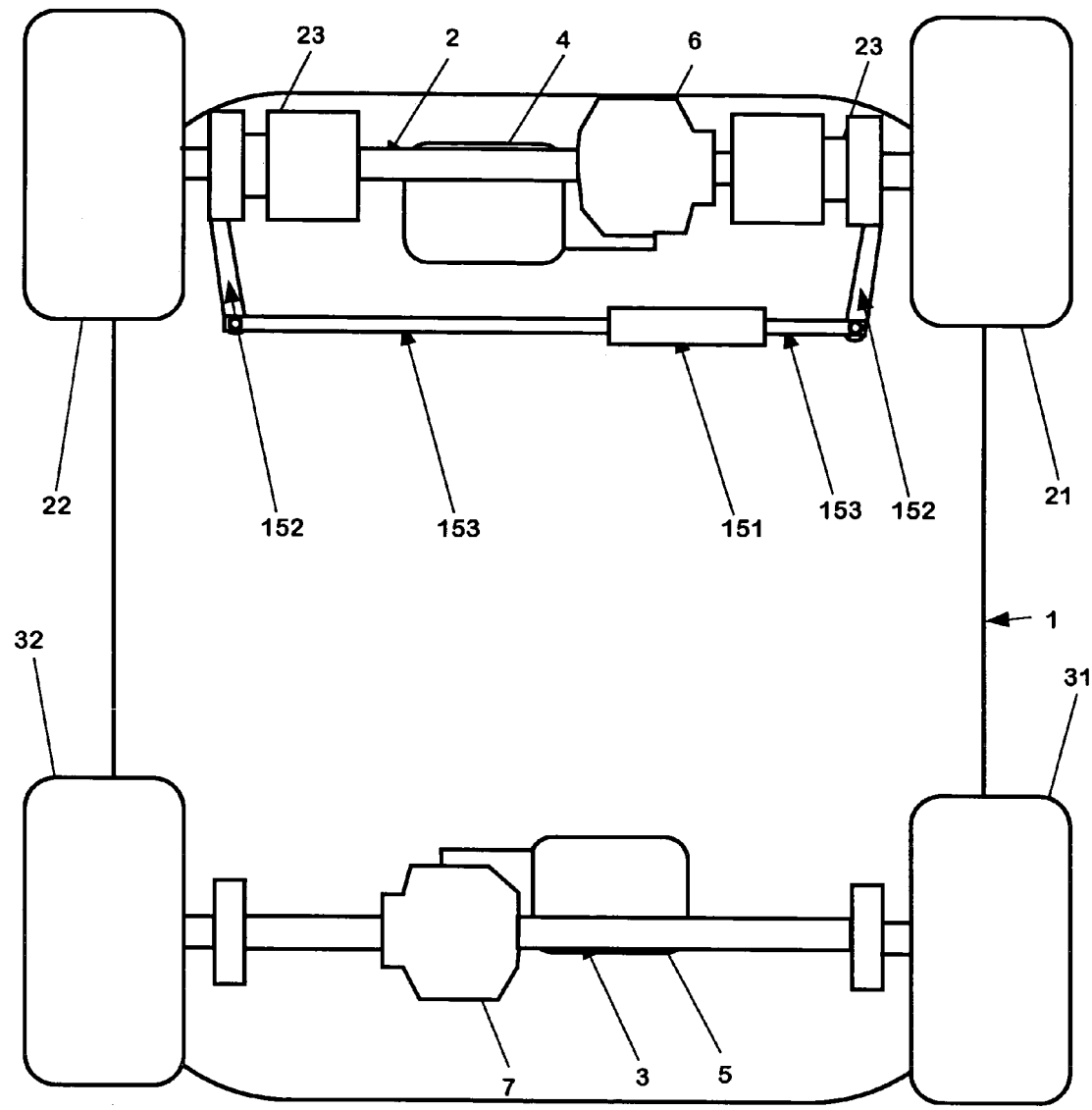
FIG. 2 is a schematic plan view of the invention from the underside thereof.
Figure 3:
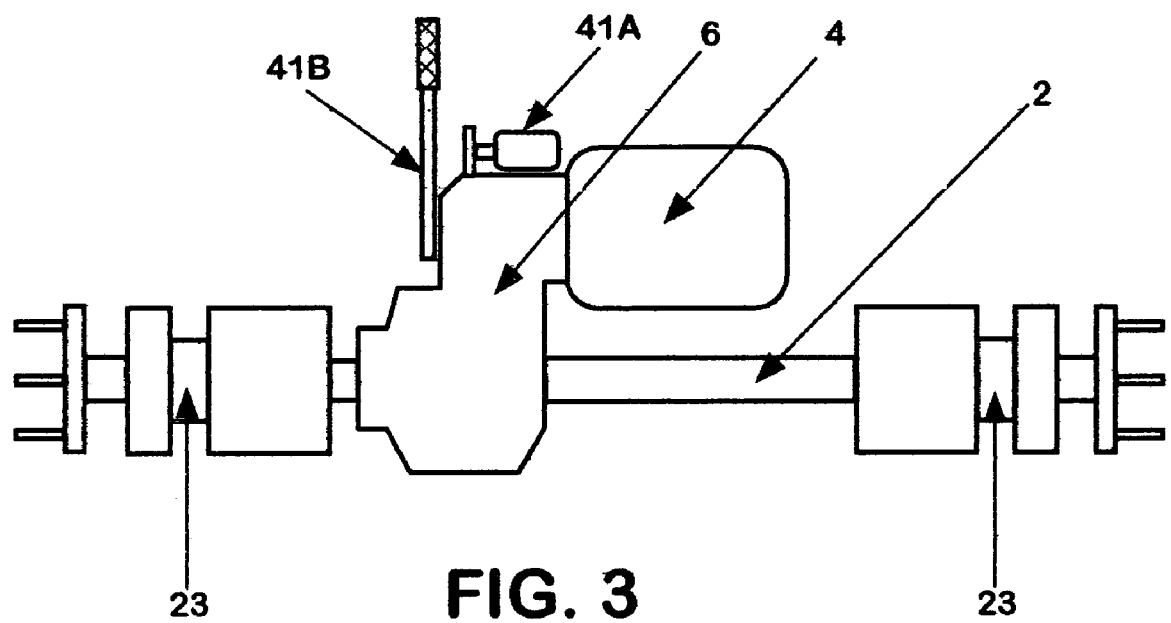
FIG. 3 is a schematic plan view of the front axle, and components thereof, of the invention from the front thereof.

Whatever means is used to provide human input to steering, whether steering wheel 15, stick-like control, tiller-like control, lever-type control or other types of controls known to those skilled in the art of vehicle design, said input means is coupled to the front wheels 21 and 22 of the vehicle, by variety of means, including but not necessarily limited to mechanical means such as rack and pinion 151 (of FIG. 2) or wishbone design, hydraulic means, cable means or variety of other means known to those skilled in the art of vehicular design. Arm means 152 and shaft 153 interconnecting arm means (as shown in FIG. 2), or other means known to those skilled in the art of vehicular design, are used to couple the two front wheels of the vehicle 21 and 22 together about their vertical axis, so that, but for slight variance of caster and camber caused by road surface variations, they always turn in the same direction.

In the preferred embodiment of the invention the vehicle will be equipped with seperate front 2 and rear 3 axles. Each axle will be powered by individual electric motors 4 and 5, which is adapted to individual differential units 6 and 7. Said differentials 6 and 7 allow the wheels on a single axle to travel at different speeds, and thereby prevent "scuffing" of tires when the vehicle is traveling along a curved path. In the preferred embodiment of the invention both of the differentials (front 6 and rear 7) will be of a "limited slip" type, varying designs of which are familiar to those skilled in the art of mechanical power transmission systems. By use of a limited slip differential both of the wheels on an axle (whether front or rear) will have some power applied to them even if one is "slipping" due to inadequate traction. Accordingly, when both electric motors 4 and 5 of the invention are powered all four wheels (front 21 and 22, and rear 31 and 32) of the vehicle will be caused to rotate. Provided at least one of said tires has sufficient traction then movement of the vehicle is assured.

However, continuous operation of both electric motors 4 and 5, on smooth and un-inclined terrain which provides good traction, is unnecessary and is therefore undesirable as operation of both will consume extra electrical power and shorten life of the battery charge. That issue might be solved by providing a switch means in the circuit which powers a motor, or by control circuitry which regulates the electrical power delivered to the motors (naturally one would not want to disable both motors simultaneously, but one might want to disable either, so that only one motor, whether it be front 4 or rear 5, is powered, unless terrain conditions require that all four wheels of the vehicle be driven). While this solution is comprehended by the invention, it is not preferred because making a motor inoperative by discontinuing electric power supplied to it leaves it remaining mechanically coupled to the wheels of the vehicle and thereby the inoperative motor constitutes a mechanical drag on the system when the vehicle is in motion. Thus it is preferable to mechanically disconnect an electric motor (whether it be the front 4 or rear 5 motor) when use of that motor is not required by terrain conditions. In the preferred embodiment of the invention this is accomplished by either of two means, each of which is equally preferred, the first of which is to provide the output shaft of the electric motor with a solenoid or inertial means 41A which decouples said output shaft from driving the differential when use of that motor is not required. Those skilled in the art of automobile engineering will be familiar with these kind of disconnects, which are frequently used on automobile starters. The second way is to provide a manually operable means 41B to disengage the motor from the gear it drives in the differential, or to disengage appropriate gearing within the gear train of the differential unit itself. Those skilled in the art of mechanical power transmissions systems will understand how to do this with differentials of various designs. Whatever way it may be accomplished the invention comprehends a means for mechanically disengaging both the front motor 4, the back motor 5, from axle 2 or 3 (as the respective case may be) when desired.

In the preferred embodiment the vehicle will have a suspension system, comprising both spring and shock absorbing (24 of FIG. 1) means, coupling the axles of the vehicle to the body 1 thereof. Such suspension systems are known to those skilled in the art of vehicular design.

A particularly novel aspect of the invention resides in its use of two separate electric motors 4 and 5, one of which is coupled to the differential of the front axle 6 and the other of which is directly coupled to the differential of the rear axle 7. In the preferred embodiment of the invention the axis (therefore output shaft) of each electric motor is disposed parallel to the axle that it drives, and is connected directly to the respective differential (without drive shaft therebetween) which it drives. In the preferred embodiment each motor is a bidirectional direct current ("DC") motor which is operable at a voltage compatible with voltage of the battery of the system. In the preferred embodiment voltage to the motor, thus power output of the electric motor, thus speed of the vehicle, is provided by infinitely variable voltage control system of substantial amperage output, such as a silicon controlled rectifier ("SCR") controller, varying designs of which are known to those skilled in the art of direct current motor control systems. However various stepped voltage control systems, such as stepping electric current through various resistive components, which are known to those skilled in the art of control of direct current motors, may be used.

The vehicle is equipped with electric battery (not shown, preferably installed under seat 12) for operation of motors 4 and 5, or other electric appurtenances as may be installed on the vehicle (such as head lights, a horn, electric brakes and the like). It is of course preferable that the battery be a rechargeable type battery, capable of suppling adequate power at a voltage appropriate for the motors of the vehicle and other electric appurtenances thereof. In preference a lead-acid battery is chosen because such battery is relatively inexpensive, rechargeable for a large number of cycles, capable of high amperage output for a given battery weight and easy to maintain. However batteries of a variety of designs, known to those skilled in the art in electrical storage systems, may be used. So long as a battery is capable of supplying voltage and amperage required over a desired length of time it might be used in the vehicle. Alternatively, electric power requirements of the vehicle might even be supplied by methane or other hydrocarbon consuming fuel cell.

The vehicle of the invention is easy to use, operates quietly; is non-polluting; when equipped with wide, low pressure tires causes little or no disturbance to the surface of the terrain; and, due to its ability for true four-wheel drive, is suitable for traversing slippery terrain and steep inclines. As the motors of the vehicle are bidirectional, the vehicle can travel either frontward or backward under its own power. In the preferred embodiment the operator of the vehicle may selectively operate the vehicle either in a two-wheel drive mode or a four-wheel drive mode. When in the two-wheel drive mode the operator may select either front wheel drive or rear wheel drive, as conditions may require or the operator may prefer. In the two-wheel drive mode the unused motor will preferably be mechanically disconnected from its respective differential so as to reduce inertial or frictional drag ultimately imposed upon the used motor.

It should be appreciated that a vehicle constructed in accordance with the principles and teachings of the present inventive disclosure constitutes an advancement in vehicular art. While the above description contains certain specifics, these should not be construed as limitations on the scope of the invention, but rather only as an exemplification of preferred embodiments thereof. Accordingly, the various elements of the invention should be understood as including alternative structures which those skilled in the arts would recognize as equivalent.

What is claimed is:

1. A motorized personnel carrier comprising:
   a. front and rear, independently operable, variable speed, bi-directional electric motors;
   b. a front drive mechanism;
   c. means to selectively mechanically engage said front electric motor to said front drive mechanism;
   d. means to selectively mechanically disengage said front electric motor from said front drive mechanism;
   e. left front wheel;
   f. right front wheel;
   g. left universal joint operatively connected between said left front wheel and said front drive mechanism;
   h. right universal joint operatively connected between said right front wheel and said front drive mechanism;
   i. means for synchronized steering said left and right front wheels;
   j. a rear drive mechanism;
   k. left rear wheel;
   l. right rear wheel;
   m. means to connect said left rear wheel to said rear drive mechanism; and,
   n. means to connect said right rear wheel to said rear drive mechanism.

2. The vehicle of claim 1 wherein said rear drive mechanism is comprised of differential gear mechanism making said left and right rear wheels rotatable at different speeds.

3. The vehicle of claim 1 further comprising:
   o. means to selectively mechanically engage said rear electric motor to said rear drive mechanism; and,
   p. means to selectively mechanically engage said second rear electric motor from said rear drive mechanism.

4. The vehicle of claim 1 wherein said front drive mechanism is comprised of differential gear mechanism making said left and right front wheels rotatable at different speeds.

5. The vehicle of claim 4 wherein the rear drive mechanism is comprised of differential gear mechanism making all four wheels of the vehicle rotatable at different speeds.

6. The vehicle of claim 1 wherein each of said universal joints are comprised of a constant velocity joint.

7. The vehicle of claim 6 wherein said front drive mechanism is comprised of differential gear mechanism making said left and right front wheels rotatable at different speeds.

8. The vehicle of claim 7 wherein the rear drive mechanism is comprised of differential gear mechanism making all four wheels of the vehicle rotatable at different speeds.

9. The vehicle of claim 6 wherein said rear drive mechanism is comprised of differential gear mechanism making said left and right rear wheels rotatable at different speeds.

10. A motorized personnel carrier comprising:
    a. front and rear, independently operable, variable speed, bi-directional electric motors;
    b. a front drive mechanism;
    c. left front wheel;
    d. right front wheel;
    e. left universal joint operatively connected between said left front wheel and said front drive mechanism;
    f. right universal joint operatively connected between said right front wheel and said front drive mechanism;
    g. means for synchronized steering said left and right front wheels;
    h. a rear drive mechanism;
    i. means to selectively mechanically engage said rear electric motor to said rear drive mechanism;
    j. means to selectively mechanically disengage said second rear electric motor from said rear drive mechanism;
    k. left rear wheel;
    l. right rear wheel;
    m. means to connect said left rear wheel to said rear drive mechanism; and,
    n. means to connect said right rear wheel to said rear drive mechanism.

* * * * *